US012267478B2

(12) United States Patent
Adam et al.

(10) Patent No.: US 12,267,478 B2
(45) Date of Patent: Apr. 1, 2025

(54) METHOD AND DEVICE FOR COMPRESSING DATA REPRESENTATIVE OF A VOLUMETRIC THREE-DIMENSIONAL SCENE WITH A VIEW TO REAL-TIME DECOMPRESSION FOR ONLINE VIEWING

(71) Applicant: 4D VIEW SOLUTIONS, Grenoble (FR)

(72) Inventors: Michaël Adam, Grenoble (FR); Clément Menier, Grenoble (FR)

(73) Assignee: 4D VIEW SOLUTIONS, Grenoble (FR)

( * ) Notice: Subject to any disclaimer, the term of this patent is extended or adjusted under 35 U.S.C. 154(b) by 169 days.

(21) Appl. No.: 18/267,894

(22) PCT Filed: Dec. 9, 2021

(86) PCT No.: PCT/FR2021/052252
§ 371 (c)(1),
(2) Date: Jun. 16, 2023

(87) PCT Pub. No.: WO2022/129737
PCT Pub. Date: Jun. 23, 2022

(65) Prior Publication Data
US 2024/0040101 A1   Feb. 1, 2024

(30) Foreign Application Priority Data
Dec. 17, 2020 (FR) .................................... 2013513

(51) Int. Cl.
*H04N 7/12* (2006.01)
*H04N 13/161* (2018.01)
(Continued)

(52) U.S. Cl.
CPC ......... *H04N 13/161* (2018.05); *H04N 19/172* (2014.11); *H04N 19/176* (2014.11)

(58) Field of Classification Search
CPC .................................................... H04N 19/597
See application file for complete search history.

(56) References Cited

FOREIGN PATENT DOCUMENTS

JP       2016-530750       9/2016

OTHER PUBLICATIONS

International Search Report issued in corresponding international patent application No. PCT/FR2021/052252 mailed Apr. 11, 2022.

(Continued)

*Primary Examiner* — Young Lee
(74) *Attorney, Agent, or Firm* — Ware Fressola Maguire & Barber LLP (57) ABSTRACT

A method for compressing a volumetric video stream comprising a plurality of frames, each associated with a mesh and a texture, with groups of frames being defined, each comprising a key frame and inter frames having meshes defined with respect to the mesh of the corresponding key frame, the method comprising: a step of compressing information representative of the textures, including, for each frame group, steps of block compressing the information representative of the textures of each of the frames, thus defining blocks of pixels; determining first blocks which can form a composite texture of the key frame and second blocks which can modify this composite texture through iterative substitutions so as to form approximate inter-frame textures; and encoding the inter-frame textures on the basis of the composite texture of the key frame and the second blocks.

15 Claims, 6 Drawing Sheets

(51) Int. Cl.
*H04N 19/172* (2014.01)
*H04N 19/176* (2014.01)

(56) References Cited

OTHER PUBLICATIONS

French Search Report issued in corresponding French patent application No. FR2013513 dated Sep. 8, 2021; 2 pages.
Jean-Eudes Marvie (Interdigital) et al, "[V-PCC][EE2.6-related] Proposition of an anchor and a test model for coding animated meshes", No. m55327, Oct. 5, 2020 (Oct. 5, 2020), 132. MPEG Meeting; Oct. 12-Oct. 16, 2020; Online; (Motion Picture Expert Group or ISO/IEC JTC1/SC29/WG11).
Faramarzi Esmaeil et al, "Mesh Coding Extensions to MPEG-I V-PCC", Sep. 21, 2020 (Sep. 21, 2020), p. 1-5, 2020 IEEE 22nd International Workshop on Multimedia Signal Processing (MMSP).
Tang Danhang et al, "Real-time compression and streaming of 4D performances", ACM Transactions on Graphics, ACM, NY, US, vol. 37, No. 6, Dec. 4, 2018 (Dec. 4, 2018), p. 1-11, XP058464802.
Collet, et al., "High-quality streamable free-viewpoint video", ACM Trans. Graphics (SIGGRAPH), 34 (4), 2015.
International Preliminary Report on Patentability, PCT/FR2021/052252, Mar. 17, 2023.
Alvaro Collet, et al., High-Quality Streamable Free-Viewpoint Video, ACM Transactions on Graphics, vol. 34, No. 4, Article 69, ACM, Aug. 2015, pp. 1-13.
Martin Isenburg, and Jack Snoeyink, Compressing Texture Coordinates with Selective Linear Predictions, Proceedings of the Computer Graphics International (CGI'03), IEEE, 2003, pp. 1-6.
Office Action, Japanese Patent Application No. 2023-537222, mailed Aug. 6, 2024, 5 pages.

|  | F1 | F2 | ... | FNf |
|---|---|---|---|---|
| B1 | ErrVal (B1/I1) | ErrVal (B1/I2) | ... | ErrVal (B1/INf) |
| B2 | ErrVal (B2/I1) | ErrVal (B2/I2) | ... | ErrVal (B2/INf) |
| ... | ... | ... | ... | ... |
| BNf | ErrVal (BNf/I1) | ErrVal (BNf/I2) | ... | ErrVal (BNf/INf) |

| F1 | F2 | F3 | F4 | F5 |
|----|----|----|----|----|
| B2 | B2 | B4 | B4 | B4 |

METHOD AND DEVICE FOR COMPRESSING DATA REPRESENTATIVE OF A VOLUMETRIC THREE-DIMENSIONAL SCENE WITH A VIEW TO REAL-TIME DECOMPRESSION FOR ONLINE VIEWING

CROSS-REFERENCE TO RELATED APPLICATIONS

This application is the U.S. National Stage of International Application Number PCT/FR2021/052252 filed on Dec. 17, 2021, which application claims priority under 35 USC § 119 to French Patent Application No. 2013513 filed on Dec. 17, 2020. Both applications are hereby incorporated by reference in their entirety.

TECHNICAL FIELD

The application relates to a method and a device for compressing data representative of a volumetric three-dimensional scene for real-time decoding for online viewing of a volumetric video by an end user.

BACKGROUND OF THE DISCLOSURE

The purpose of the invention is to compress volumetric data, which are representative of three-dimensional scenes, for viewing "online" by an end user.

A method aimed at this objective is described in the article "High-quality streamable free-viewpoint video", *ACM Trans. Graphics* (SIGGRAPH), 34 (4), 2015.

According to said method, the volumetric data is obtained from the capture of a three-dimensional scene by photogrammetry, that is to say by means of a set of cameras, consisting of 106 cameras in this case, each capturing an image of the scene from a particular angle at a frequency in the order of 30 to 60 images captured per second.

Said images are used to recreate the action of the scene by calculating a point cloud for each instant of capture of the scene, or frame.

Said point clouds are representative of the surfaces, viewed by the cameras, of the elements of the scene, and serve as a basis for the modeling of the scene by a mesh of triangles connected continuously to one another, onto which a texture is applied, independently for each frame in a first step.

In this step, the number of triangles employed and the connectivity thereof are different for each frame.

In a second step, in order to favor the compression of the resulting data, a geometric tracking of the mesh is carried out over time, consisting in converging the meshes constituting the frames by deformation of a reference mesh belonging to a frame called the "key frame", so that the meshes of the subsequent frames have the same number of triangles and the same connections as said reference mesh.

When it is not possible to approximate a mesh acceptably by deformation of the mesh of the reference frame, a new mesh is defined for a new reference frame, and the operation is repeated until the meshes of all the frames are processed.

The frames whose mesh is defined on the basis of the mesh of a key frame, and which are situated between two key frames, are said to be "inter-frames".

The compression of the data relating to the mesh benefits from the temporal redundancies between the neighboring frames whose mesh is based on that of the same key frame.

A mesh of a key frame is entirely encoded, while only the mesh variations are encoded for the inter-frames, which is more economical in terms of the volume of resulting data and the computational intensity for their decoding as well as the complete encoding and decoding of the meshes of each frame.

However, the encoding of the mesh data may also be improved.

As regards the textures pressed onto the meshes, a complete atlas of textures corresponds to each frame, said atlas must be encoded and then decoded entirely during the compression and the decompression, respectively, according to the principle of the MPEG and H.264 compression standards.

The processing and transmission of the data of said texture atlases represent a calculation cost and high bandwidth, that it is desirable to reduce.

Furthermore, the methods employed have originally been developed for the purpose of creating videos with "conventional" images such as those of a film, and not with textures which are images composed of patches on a plain background.

A more suitable method for compressing texture atlases is required.

In the field of audio/video compression, the following documents are known:

"[V-PCC] [EE2.6-related] Proposition of an anchor and a test model for coding animated meshes", by Jean-Eudes Marvie et al., 132. MPEG MEETING; 20201012-20201016; ONLINE; (MOTION PICTURE EXPERT GROUP OR ISO/IEC JTC1/SC29/WG11), no. m55327, 5 Oct. 2020 (2020-10-05), XP030292836;

"Mesh Coding Extensions to MPEG-I V-PCC", by Faramarzi Esmaeil et al., 2020 IEEE 22ND INTERNATIONAL WORKSHOP ON MULTIMEDIA SIGNAL PROCESSING (MMSP), [Online], 21 Sep. 2020 (2020-09-21), pages 1-5, XP055837185; and "Real-time compression and streaming of 4D performances", by Tang Danhang et al., ACM TRANSACTIONS ON GRAPHICS, ACM, NY, US, vol. 37, no. 6, 4 Dec. 2018 (2018-12-04), pages 1-11, XP058464802.

These documents process compression methods which are typically methods of the AVC type (Advanced Video Coding) such as MPEG, JPEG, HEVC (High Efficiency Video Coding), or h.264.

The temporal video compression of this type of method relies, in order, on the definition of blocks by cutting an image, the comparison between blocks of two adjacent frames, then the encoding/compression of a difference between two blocks; during the decoding, this difference is applied individually to each pixel.

The purpose of the methods of this type is to provide a lowest possible transmission rate over a computer network, without consideration for the transfer of the images between the processor and the graphics card of a computer processing these image data streams, or for the utilization of the memory of the graphics card.

Thus, this type of method does not respond to the problem addressed by the present patent application.

SUMMARY OF THE DISCLOSURE

The purpose of the invention is to improve firstly the compression of the information relating to the meshes of the frames of a volumetric video stream, and secondly the information relating to the textures associated with said same frames.

The application relates more particularly to a method for compressing a volumetric video stream of a three-dimensional action scene represented by a plurality of frames, the method being implemented by computer, and whereby a mesh and a texture are generated for each frame of the scene and groups of frames each comprising a key frame and inter-frames are defined, the meshes thereof being defined with respect to the mesh of the corresponding key frame, the method comprising a step of compressing the information representative of the textures, the texture compression step comprising, for each group of frames, the steps of compressing the information representative of the textures of each of the frames of the group according to a block compression method capable of forming blocks that are directly usable by a conventional graphics processing unit according to standard algorithms such as DXT, ASTC or PVRTC, thus defining blocks of pixels directly usable by a conventional graphics processing unit, and comprising blocks associated with the key frame and blocks associated respectively with each of the inter-frames; determining from the blocks associated with the key frame and the blocks associated with the inter-frames, on the one hand, first blocks capable of forming a composite texture of the key frame, and on the other hand, second blocks capable of modifying the composite texture of the key frame by iterative replacements of blocks so as to form approximate textures of the inter-frames; forming a composite texture of the key frame of the group of frames from first blocks associated with the key frame and first blocks associated with the inter-frames, and encoding said composite texture; and encoding the textures of the inter-frames on the basis of the composite texture of the key frame and the second blocks.

The compression of the information representative of the textures according to the method in particular takes advantage of the temporal correspondence that exists between the textures of the successive frames forming a volumetric video stream, avoiding the encoding, the transmission, and then the decoding of redundant information.

The decompression of the encoded video stream by means of the compression method has a low calculation cost and the compression level can easily be chosen by means of a simple parameter, making it possible to adapt the compromise between the compression level and the ease of decompression to the requirements of the user and therefore to obtain a volumetric video stream particularly suitable for reading in real time.

The compression method of a volumetric video stream according to the application may have the following features:

the steps of encoding the composite textures of the key frames and of the textures of the inter-frames may comprise compression by means of entropy coding;

the step of determining the first blocks and the second blocks can comprise a step of evaluating quantized graphical differences of the blocks of a group of frames of a given position relative to one another, said step of evaluation relying on calculations such as PSNR (Peak Signal to Noise Ratio) calculations between two considered blocks, resulting in numbers each representative of the graphical variations between said two considered blocks;

for each of the blocks of the group of frames, the graphical differences are evaluated vis-à-vis all of the other blocks of the group of frames;

the step of determining the first blocks and the second blocks can further comprise a step of constructing a graph comprising nodes interconnected along rows and columns, the quantized graphical differences being assigned to a displacement cost along a row between two nodes and a cost being assigned to the displacements along a column; and a step of determining a lowest cost path in said graph, each start of path at a column being associated with one of the first blocks and each displacement along a column being associated with one of the second blocks, the lowest cost being a sum of the costs of displacement each between two nodes on a same row and the costs of displacements each between two nodes in one and the same column, the path being composed of the displacements each between two nodes on a same row and displacements each between two nodes in a same column;

the step of determining a path may implement a Dijkstra algorithm;

the method may further comprise a step of compressing the information representative of the meshes comprising the steps of compressing the information representative of the meshes by quantization; compressing the information representative of the quantized meshes according to a compression method which comprises the steps of compressing information representative of triangles of the meshes of the key frames according to the Edgebreaker algorithm; compressing information representative of points of the meshes of the key frames according to a prediction algorithm; compressing information representative of the texture coordinates of the key frames according to a linear selective prediction algorithm; and compressing information representative of points of the inter-frame meshes by differential encoding; and compressing, by means of an entropy calculation algorithm, the compressed information representative of said points of the meshes, of said triangles and of said texture coordinates of the key frames and the information representative of the points of the meshes of the inter-frames, The method described herein may extend to:

a data processing system data comprising means for performing the steps of the method;

a computer program comprising instructions which, when the program is executed by a computer, lead the latter to implement the steps of the method; and a computer readable medium comprising instructions which, when executed by a computer, lead the latter to implement the steps of the method.

BRIEF DESCRIPTION OF THE DRAWINGS

The present disclosure will be better understood and other advantages will become apparent on reading the detailed description of the embodiment taken by way of non-limiting example from and illustrated by the appended drawings, wherein.

DETAILED DESCRIPTION

Figure 1A:
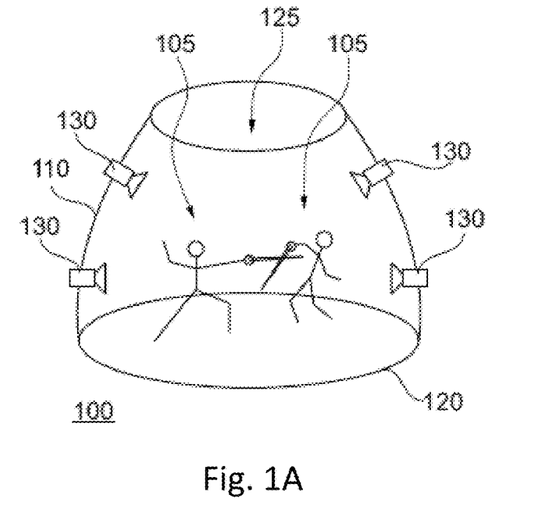
FIG. 1A shows a videogrammetry studio including cameras.

In order to reconstitute a volumetric action scene, that is to say a scene taking place over time and in the three directions of space, the scene is played by actors 105 in a videogrammetry studio 100 with a green background.

Such a studio is composed of a structure 110 surrounding a stage 120 and which has the function of supporting a set of cameras 130 observing the scene 125 according to a variety of viewing points.

Figure 1B:
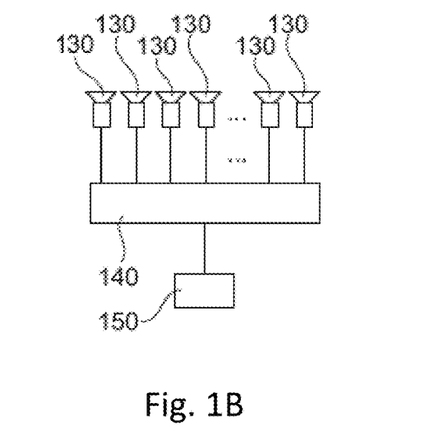
FIG. 1B is a diagram of the image capture and data processing system of the cameras in FIG. 1A.

The cameras 130 are connected to a data storage and processing system 140, as well as to a user interface 150.

Figure 1C:
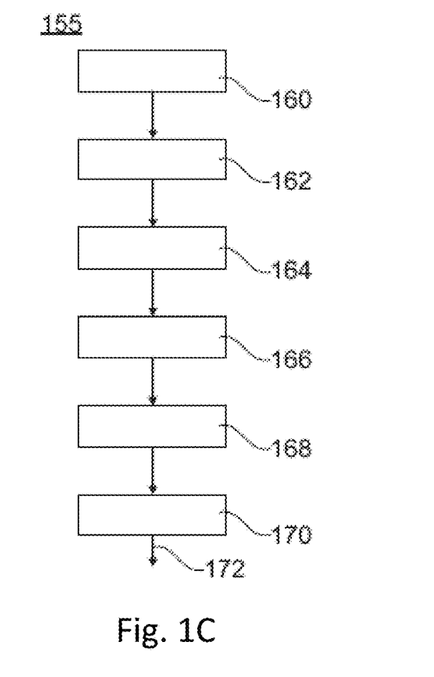
FIG. 1C is a diagram of a method for producing volumetric videos of a scene.

Method for producing a volumetric video using the studio 100 comprising the following steps of the diagram 155 of FIG. 1C.

In a step 160, the cameras capture the scene in a synchronized manner, for example at a frequency of between 30 and 60 images per second, each from its own viewing point, which makes it possible to reconstruct the scene in its entirety.

In a step 162, the images captured by the cameras are optionally processed for calibration, to correct biases or other errors, and to subtract the background therefrom, according to conventional methods.

Figure 1D:
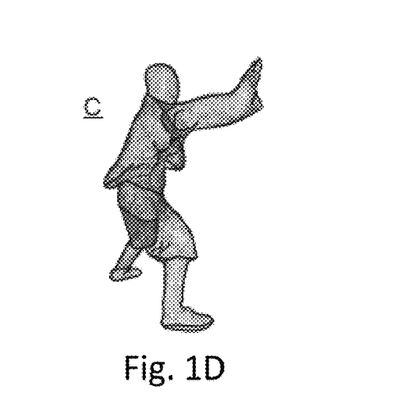
FIG. 1D shows a point cloud as defined in the method of FIG. 1C.

In a step 164, these reprocessed images feed an algorithm known to a person skilled in the art, implemented by the data processing system 140 so as to produce point clouds C such as illustrated by FIG. 1D, representative of the objects constituting the scene, by establishing depth maps of the visible surfaces of said objects according to the stereography principle, by comparison of the images of the same physical surface captured by different cameras at different viewing angles.

Figure 1E:
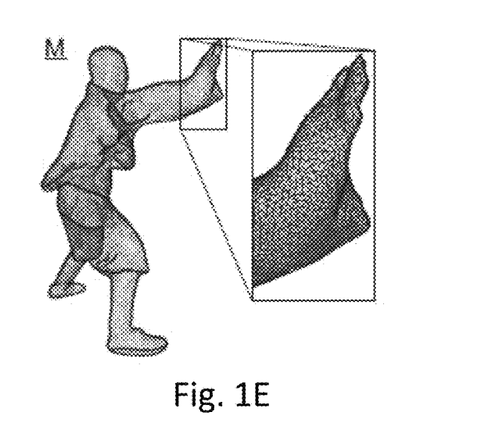
FIG. 1E illustrates a mesh corresponding to the point cloud of FIG. 1D.

In a step 166, a mesh M is generated as illustrated by FIG. 1E from the point clouds obtained, and a texture intended to be applied thereto, according to conventional methods, such as by reconstruction of Poisson surfaces and use of the UVAtlas source code, copyright® Microsoft Corporation, respectively for each frame, independently from one frame to another.

At this stage, the scene is represented by a succession of frames F, each frame being associated on the one hand with information representative of a respective texture T, and on the other hand with information representative of a respective mesh M, independently from one frame to another.

Figure 2A:
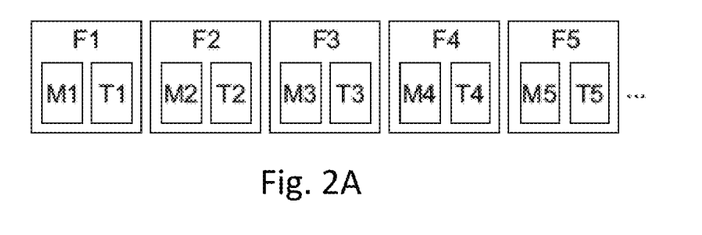
FIG. 2A shows a succession of frames.

Thus, FIG. 2A illustrates 5 frames F1 to F5 in succession, each associated respectively with a mesh M1 to M5 and a texture T1 to T5.

Each mesh consists of a set of points interconnected by triangles, recreating the surface of the objects of the scene, and each triangle being associated with texture coordinates by means of a texture coordinate table in order to be able to correctly apply the texture onto the triangles.

The triangles are used as elementary surfaces making up the surfaces of the objects such as seen by the cameras.

Another type of elementary surface could be employed, but for clarity of the explanations, we will continue to employ an example implementation in the application based on triangles.

A geometric and photometric tracking step 168 is implemented in order to distribute the frames F into groups of frames FGr each comprising a key frame KF and a plurality of inter-frames IF.

Figure 2B:
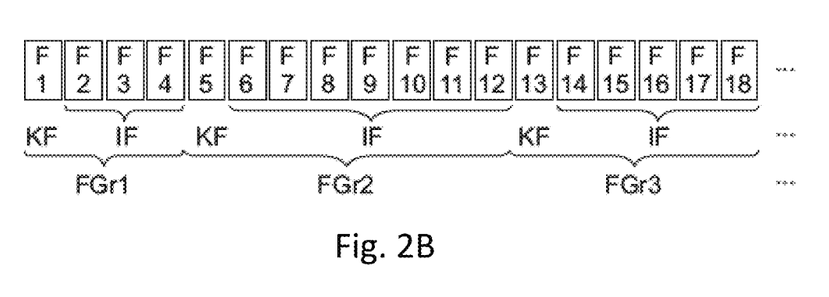
FIG. 2B shows a distribution of the frames of FIG. 2A in groups.

Thus, FIG. 2B illustrates 18 frames F1 to F18 distributed in three groups of frames FGr1 to FGr3 each comprising a key frame KF and variable number of inter-frames according to the groups, frames being obtained in a stream 172 in output step 170.

A reference mesh is associated with each key frame, the meshes of the inter-frames are defined by deformation of the reference meshes, i.e. by means of information representative of the deformations of the meshes associated with the corresponding key frames, and a texture is associated with each frame.

Figure 2C:
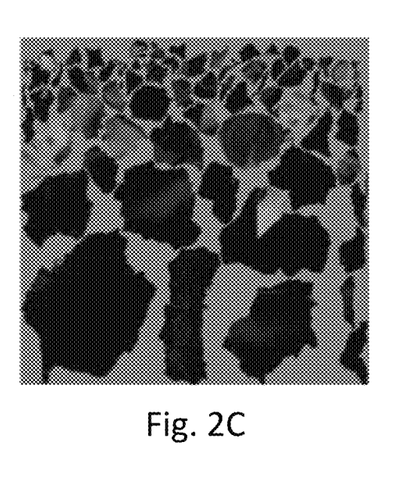
FIG. 2C shows a texture.

Each texture may be represented by an image comprising patches on a uniform background, as illustrated by FIG. 2C.

The information representative of the meshes consisting, in the case of key frames, of information representative of the points of the mesh, i.e. data for locating said points in a three-dimensional space; in information representative of the triangles of the mesh, i.e. data of surfaces each comprised between 3 of the points of the mesh; and of information representative of the textures associated with respective triangles of the mesh, i.e. texture coordinates data.

The above steps are known to a person skilled in the art, explained for example in the publication "High-quality streamable free-viewpoint video", *ACM Trans. Graphics* (SIGGRAPH), 34(4), 2015.

Figure 3A:
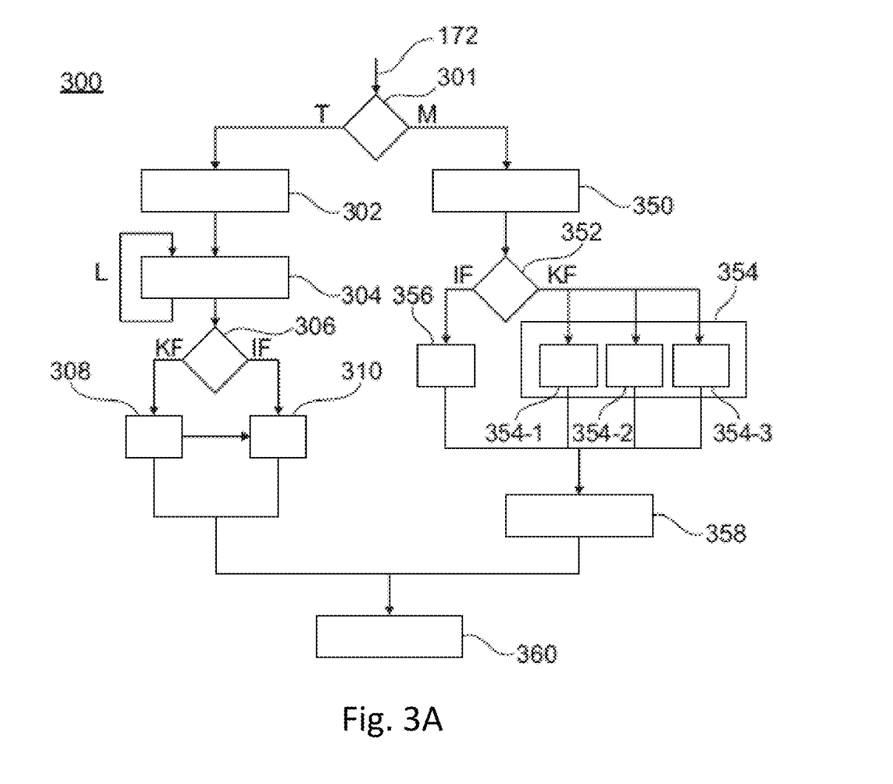
FIG. 3A is a diagram of the method according to the application.
Figure 3D:
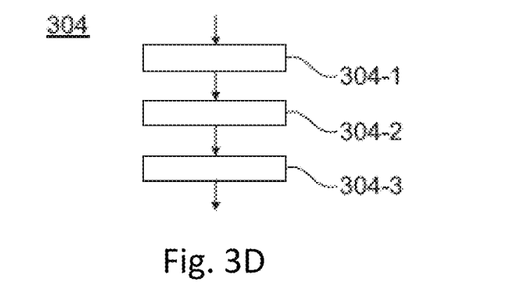
FIG. 3B is a diagram of a particular step of the method according to the application.

The following steps lead to an improvement with respect to conventional volumetric video compression methods as regards, on the one hand, the compression of the information representative of the textures and, on the other hand, the compression of the information representative of the meshes, consideration being given to a subsequent decompression step, as detailed below using the diagrams 300 and 304 of FIGS. 3A and 3B, respectively.

Compression of the Textures

At the end of the preceding steps, each frame is associated with a texture which is specific to it within a stream 172 of video data comprising texture data T and mesh data M, each texture being a digital image.

In a test step 301, it is determined whether the incoming data is mesh data M or texture data T.

In a step 302, a block compression is applied to each texture associated with a frame of the stream of frames, the textures being retrieved in the texture data T, so that the texture of each frame is associated with a set of blocks.

Block compression is a conventional compression method making it possible to reduce the quantity of memory required to store color data, wherein blocks of pixels (such as squares of 4 pixels by 4 pixels or 8 pixels by 8 pixels) are compressed taking into consideration that the variations inside one and the same block are very low, according to standard algorithms such as DXT, ASTC or PVRTC.

In this document, the term "block" refers to blocks obtained by an algorithm of the type of those mentioned in the preceding paragraph and which are directly usable by a conventional graphics processing unit, or GPU, that is to say without requiring decompression or another processing operation.

Thus, the "blocks" as considered in the method according to the application are distinct from the "blocks" used in compression methods such as those of the JPEG and MPEG encodings which are AVC (Advanced Video Coding) mentioned above in the "Prior art" section.

Indeed, the blocks used in the AVC type methods directly result from a cutting of an image and are therefore each a group of pixels.

Their nature is thus different from that of the blocks of the method according to the application which are the result of a compression operation applied to said pixels, and the nature thereof will therefore depend on the principle of the compression used for the compression operation, but will not be that of a group of pixels.

One feature of the blocks of the methods of the AVC type is that they are usually not considered to be directly usable by a graphics processing unit, unlike the blocks of the method according to the application.

Indeed, the block compression according to the application results in data that can be decoded directly by the conventional graphics processing units.

During decoding, it will therefore not be necessary for the central computing unit of a data processing unit, or CPU, to decompress the textures compressed by blocks before sending them to a graphics processing unit, or GPU, which makes it possible to limit the computations to be performed on the CPU and to greatly reduce the amount of data to be sent to the GPU, In the context of a real-time reading of a volumetric video stream, this feature represents a determining advantage by reducing the quantity of data to be transferred and the calculation cost of the decompression of the data transferred.

A strong advantage of the method according to the application compared with conventional methods is thus to take advantage of the capacity of the GPUs to carry out decompression operations on the blocks in order to facilitate the processing of the video streams obtained.

Furthermore, the block compression within the meaning of the application is particularly suitable for the compression of textures, in particular those of the atlas type, and much more suitable than an image compression such as that used in JPEG and MPEG coding.

However, the blocks that are directly interpretable by a GPU as considered in this application are difficult to compress due to the fact that it is not possible to modify a block by a difference.

Conventional techniques relying on a compression by difference are therefore not applicable.

For each group of frames, a method for reducing the textures is applied during a step 304, according to the following original method called a reduction by partial texture.

Figure 2D:
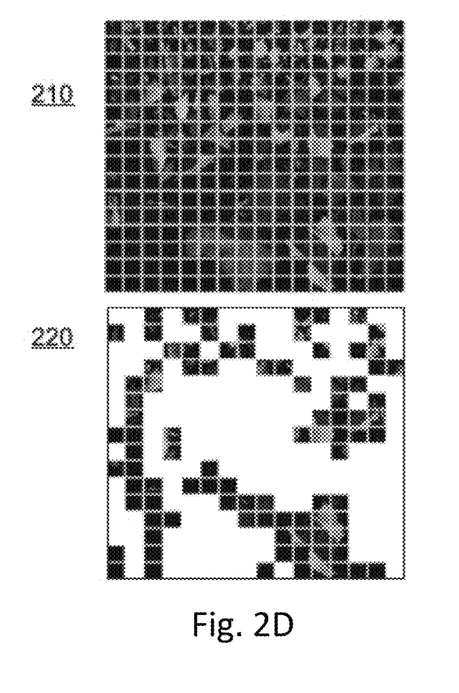
FIG. 2D shows a complete texture for a key frame (a) and a partial texture for an inter-frame (b) according to the application.

In this step, from among blocks associated with the key frame and blocks associated with the inter-frames of a group of frames, a first set (210) of first blocks capable of forming a composite texture of the key frame, and a second set (220) of second blocks capable of modifying the composite texture of the key frame so as to form approximate textures of the inter-frames.

Thus, instead of entirely encoding all of the blocks of each texture associated with a frame, only the blocks of a reconstituted texture of each key frame are entirely encoded, but with regard to the inter-frames, it is only the encoded blocks that provide significantly new information.

This feature allows a considerable reduction in the volume of texture data to be encoded during the compression, then to transmit and decode upon on-line viewing of the video.

The blocks encoded for the inter-frames are used to modify the composite texture of the key frame by iteration to each new frame, when necessary to maintain an acceptable visual quality.

FIG. 2D illustrates this situation, with a complete texture of a key frame, complete texture formed by a set 210 of 256 blocks, and a set 220 of 92 blocks forming a partial texture of an inter-frame corresponding to said key frame, the missing blocks being considered to be sufficiently close to those of the key frame in order not to have to be encoded again.

Instead of the non-encoded blocks, already-encoded blocks that are graphically close to said non-encoded blocks are used, as long as the degradation in terms of visual quality remains acceptable.

The already-encoded blocks are either those of the key frame, or blocks of a partial texture already present as a replacement for those of the key frame, so that textures close to the textures of the inter-frames are obtained by modifying the texture of the key frame by successive iterations.

This principle can be used according to the particular embodiment detailed below with the aid of FIGS. 3B and 4A to 5C.

The data from the stream of frames consist of groups of frames, each group comprising a key frame followed by inter-frames, in temporal succession.

The textures associated with the frames of the same group appear naturally, a consequence of the definition itself of the groups by geometric and photometric tracking, and therefore have a large number of blocks in common that it is not necessary to re-encode multiple times, the initial encoding of a reconstituted texture for the key frame and of certain blocks chosen for inter-frames being sufficient.

The issue of partial texture reduction is the determination of which blocks are to be used for the texture of the key frame and which blocks require an update within each group of frames, so as to minimize the number of blocks to be encoded, while maintaining acceptable the visual quality of the final video.

For a given block position, the graphical differences of the blocks of each frame relative to one another, either directly from block to block, or from block to a non-compressed texture corresponding to a block, as described below, are evaluated during a sub-step 304-1.

If a group of a number Nf of frames is considered, there are potentially Nf possible variants for each pixel block position in the texture image.

In fact, Nf different blocks B1 to BNf follow one another at the same position respectively during frames F1 to FNf and may be considered as the temporal variants of a given block during the Nf frames F1 to FNf considered.

Figure 5A:
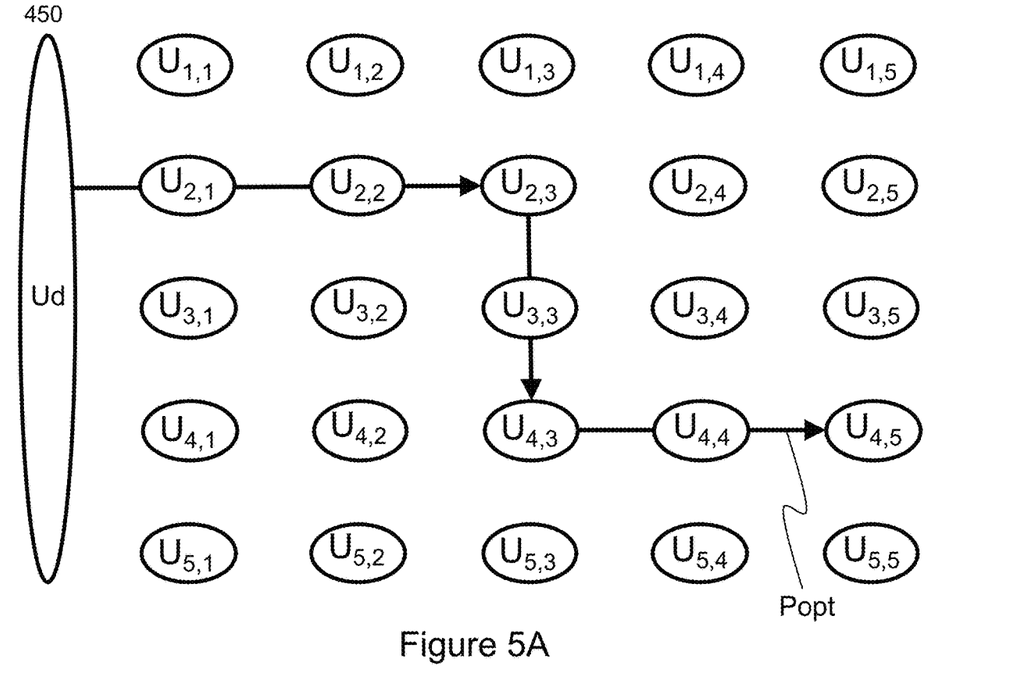
FIG. 5A is a particular case of the graph of FIG. 4B after processing according to the application.
Figure 5B:
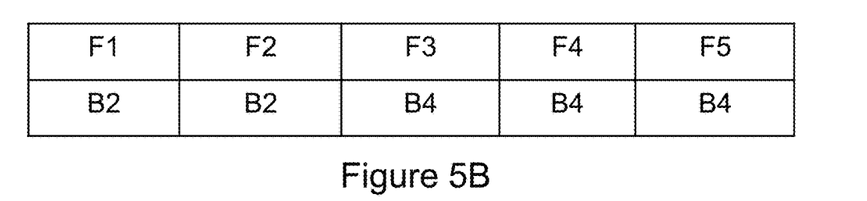
FIG. 5B is a table summarizing the results from FIG. 5A.
Figure 5C:
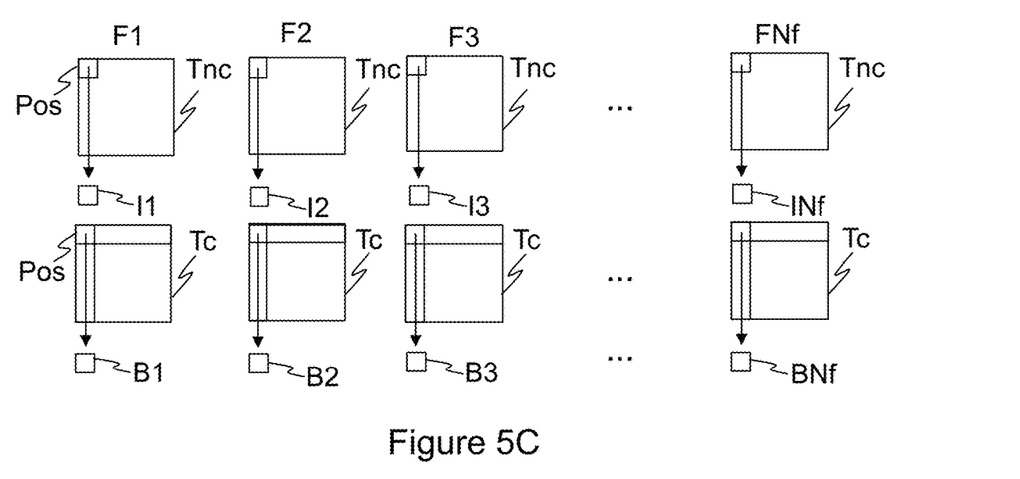
FIG. 5C shows the non-compressed and compressed textures of a succession of frames.

For illustration, reference will be made to FIG. 5C representing a group of a sequence of Nf frames each associated with a non-compressed texture Tnc and a compressed texture Tc, the blocks 131 to BNf corresponding to the same position Pos in the respective compressed textures Tc and to images (or sets of pixels) I1 to INf corresponding to said same position in the respective non-compressed textures Tnc.

The blocks B1 to BnF and the images I1 to INf consist of sets of pixels of the same position, of the same geometry and of the same dimension.

To evaluate the graphical variations between the blocks, a PSNR, standing for Peak Signal to Noise Ratio, is commonly used in digital imaging to evaluate the quality of the reconstruction of a compressed image with respect to its original image.

Other methods for evaluating the graphical variations of the blocks could be employed, the PSNR representing only one possibility.

For a given block position of compressed textures Tc, a PSNR is calculated between the blocks B1 to BNf of the respective frames F1 to FNf and the images I1 to INf of the same position of the non-compressed textures of the corresponding frames of the same group, which gives us Nf×Nf PSNR computations to be performed.

In this way, for each of the blocks of the group of frames considered, the graphical differences are evaluated vis-à-vis all of the other blocks of the group of frames, as well as, in the present case, vis-à-vis the non-compressed image of the considered block.

Reference is made here to non-compressed textures in order to ensure the fidelity of the encoded video to the original images, but it would also be possible to calculate the PSNR between each block of a given frame and the corresponding blocks of the compressed textures of the other frames.

The PSNR constitute an indication of the similarity between two images, here a first image which is that of a block defined during the block compression step and a second image which is the one formed by a group of pixels corresponding to the block in a non-compressed image.

In addition, the PSNR is expressed on a logarithmic scale and a large value of PSNR is indicative of a significant similarity between two images.

In order to express numerically the amplitude of the differences between blocks from one frame to another, therefore over time, on a linear scale, an error value ErrVal is calculated during a step 304-2 for each of the Nf×Nf PSNR calculated in step 304-1.

Figure 4A:
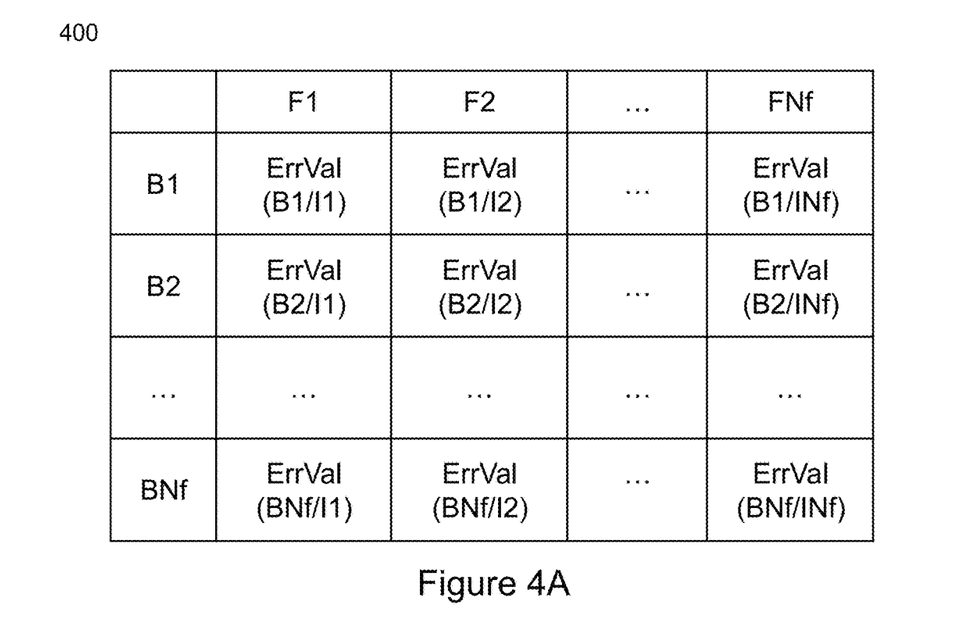
FIG. 4A is a table of error values.

A step 304-3 consists in constructing, for each block position in a group of Nf frames, a square table 400 comprising Nf×Nf entries, each consisting of one of the error values ErrVal calculated in step 304-2.

Each row of Table 400 is dedicated to the evaluations of the temporal variations of a given position block over Nf frames F1 to FNf, referring here to the images I1 to INf corresponding to the blocks in the corresponding non-compressed textures.

Each column of table 400 is dedicated to a frame, the frames being classified in their order of appearance in the volumetric video stream and being identified F1 to FN.

The entries in the table are filled by inserting therein the error values ErrVal calculated in step 304-2 as follows.

An entry of coordinates (p;q) of the p-th row and of the q-th column of table 400 corresponds to an error value ErrVal (Bp/Iq) calculated between a p-th block at a given position of compressed texture of the p-th frame and an image Iq of a set of pixels at said given position of the texture not compressed to the q-th frame Fq, and translates the amplitude of graphical difference between said p-th block and said set of pixels.

For example, the second entry of the first row of the table corresponds to an error value ErrVal (B1/I2) calculated between the first block B1 to the first frame F1 and the set of pixels 12 corresponding to said block in the non-compressed texture at the second frame F2 before compression by block, and translates the amplitude of graphical difference between said first block B1 and said set of corresponding pixels 12.

The entries of the diagonal (B1;F1) to (BNf/FNf) of the table translate the amplitude of the graphical difference between a block and the corresponding group of pixels of the non-compressed texture of one and the same frame, indicating the degradation of video image quality introduced by the block compression step.

A possible approach defined by the inventors to minimize the amount of data to be encoded and then decoded upon reading a video stream consists in minimizing the number of blocks to be encoded by making a choice from among the blocks by means of table 400 which indicates the errors introduced by the block compression of step 302, not only within a frame, but also between the frames of the same group for a given position of blocks.

The choice amounts to determining, within the table, a path having the lowest possible cost for moving from any entry of the first column to the left of the table corresponding to the first frame of the considered group to any entry of the last column to the right corresponding to the last frame of the considered group, moving either toward the right or vertically (upwards or downwards), by introducing a cost for each horizontal displacement, a cost for each vertical displacement, and by seeking to minimize the overall cost induced by the tracked path.

During a horizontal displacement, the block located at the starting point of displacement to the corresponding frame referred to as the previous frame is chosen as the encoded block and said block is retained to the displacement destination, called the subsequent frame after a succession of individual horizontal displacements, without encoding the intermediate blocks in the video stream that will be produced.

When a block is used to encode successive images, the visual quality of the encoded images tends to degrade with their temporal distancing from the image that has been used to generate said block.

Thus, the error value ErrVal tends to increase with the length of the horizontal displacement.

Consequently, it is necessary to limit the amplitudes of the horizontal displacements by imposing vertical displacements, corresponding to the encoding of a new block that is more suitable for encoding the images of the new frames, which is favorable from the point of view of visual quality, but unfavorable from the points of view of the data compression ratio, the transmission thereof and the decompression thereof during the visualization of the video stream.

One way to optimize the path is to assign a first cost to the degradation of the visual quality induced by the reuse of a same block to encode the images of several frames, to assign a second cost to the computational intensity, corresponding to the increase in the quantity of data to be encoded, then to determine the minimizing path, the overall cost representing the sum of the first cost and the second cost.

Figure 4B:
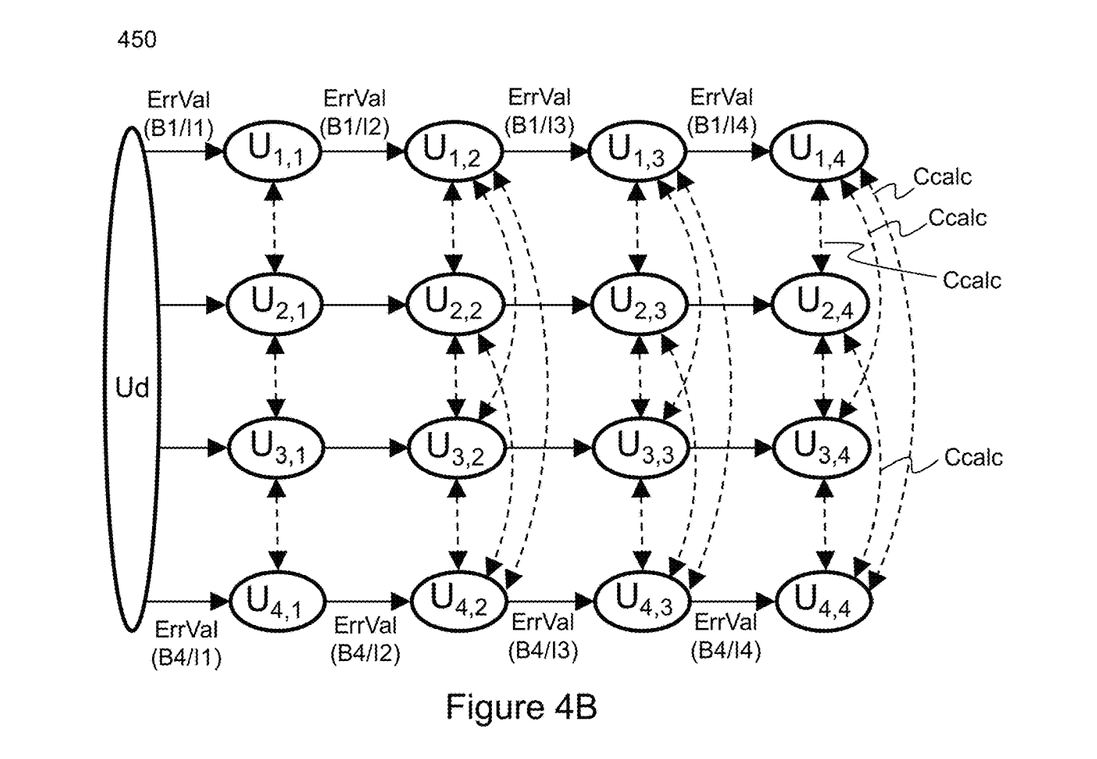
FIG. 4B is a graph constructed on the basis of the table of FIG. 4A.

The optimal path can be determined by conventional graph theory methods, for example by the graph 450 of FIG. 4B plotted from table 400, said graph consisting of nodes and possible displacements between said nodes, by determining the path as a function of parameters, here the costs mentioned above, defined by the practitioner according to their objectives and priorities.

The central nodes of the graph 450 are identified by $U_{p,q}$ and correspond to the entries of the p-th column and the q-th rows of the table 400.

A node $U_{p,q}$ of the graph corresponds to the use of a block from the block position considered in the texture of the $p^{th}$ frame for encoding the texture of the $q^{th}$ frame.

The nodes are arranged in the same way as the entries of the table, in Nf rows and Nf columns, a dummy start node Ud being connected along the rows to each of the nodes corresponding to the entries ErrVal (BI/II) to ErrVal (BFn/II) of the first column of the table, with in this example the number of frames Nf being equal to 4.

In graph 450, each ellipse represents a node and each arrow represents a possible displacement between two nodes.

The possible displacements in the graph are horizontal, within the same row, or vertical, within the same column.

The possible horizontal displacements are carried out from a given node to the immediately adjacent node to its right, as represented by the solid line arrows of graph 400, for a cost of visual degradation considered to correspond to the value ErrVal of the table entry corresponding to the end node of the considered displacement.

The possible vertical displacements are made between two nodes located one above the other, immediately adjacent or not, as represented by the dotted arrows, for a computational cost Ccalc defined by the user.

Here, the cost to go, for example, from the node $U_{1,3}$ to the node $U_{1,4}$ is ErrVal (B1/I4) and the cost to go from the node $U_{1,3}$ to the node $U_{3,3}$ or U node$_{3,4}$ is Ccalc.

The shape of the graph and the displacement rules therein being defined, the optimum path sought can be determined by, among other conventional methods, implementation of the Dijkstra algorithm, generally used to determine the shortest path between two points of a graph consisting of a plurality of interconnected nodes, which is the case of the graph 450.

The optimal path, that having the lowest overall cost, is considered to be that which permits a minimization of the volume of data to be encoded compatible with an acceptable video quality.

The video quality is determined by the practitioner by choosing the Ccalc cost according to criteria dependent on their priorities, a high Ccalc cost promoting a high compression ratio, a low Ccalc cost resulting in a high visual quality, an intermediate Ccalc cost leading to a compromise between the compression ratio and the visual quality.

For conventional compression operations, the Ccalc cost is preferably of the order of 0.0001, for example between 0.00001 and 0.001, or could for example be initialized at an average value of the error value ErrVal.

For example, FIG. 5A shows an application of the graph 450 to the particular case of a group of 5 frames for a given block position, with an optimal path Popt passing through the nodes $U_{2,1}$, $U_{2,3}$, $U_{4,3}$ and $U_{4,5}$ therefore including a change in rows between the nodes $U_{2,3}$ and $U_{4,3}$.

For the given block position, the block B2 of the second frame is encoded and used for the first and second frames F1 and F2 during the coding of the video, that is to say for the composite texture of the key frame and the first inter-frame.

This block B2 does not need to be re-encoded for the second frame since it has already been encoded for the first.

The block B4 of the fourth frame is encoded and replaces the block B2 for the frames 3 and subsequent frames F3, F4 and F5.

Block B4 is encoded only once but is used for 3 frames.

From a practical point of view, the practitioner can expect to process groups of frames comprising up to several tens of frames.

Step 304 as described above applies only to a given block position within the textures of the inter-frames of each frame group.

Said step 304 is therefore repeated to be applied to each block position in order to determine the blocks to be used to encode the textures in their entirety, as indicated by the loop L in the diagram 300.

At a test step 306, it is determined whether a frame is a key frame KF or an inter-frame IF.

In a step 308, the set of blocks necessary for encoding the complete texture associated with a key frame and as determined in step 304 for each block position is recovered, so that a composite texture is formed for said key frame, and a conventional compression method, such as an entropy compression method, is applied to said composite texture; by Huffman coding, for example.

Thus, for each key frame, a complete composite texture is encoded by using blocks of different textures associated with respective frames of the group of frames of the key frame considered, as described above.

This point represents a first difference in relation to the conventional encoding of textures, wherein the texture associated with a key frame is encoded exclusively with the blocks resulting from the compression thereof by block, independently of the textures of the neighboring frames.

In a step 310, the blocks newly encoded for each inter-frame as determined in step 304 are recovered for said inter-frame.

Thus, for each inter-frame only a partial texture consisting of the blocks to be encoded for said frame and, optionally, for the subsequent frames will be encoded.

In this way, only a part of the blocks of the texture of this inter-frame is encoded, instead of a complete texture as for a key frame.

It is also advantageous to compress the blocks by a conventional entropy coding method before transmitting them, possibly streaming within a video stream.

Thus, as explained above and illustrated by FIG. 2D, only the blocks of a reconstituted texture of each key frame are totally encoded, but as regards the inter-frames, the only blocks encoded are those which provide significantly new information.

These features result in a considerable improvement in the compression ratio and in a saving of calculations during the reading of the video since fewer blocks must be encoded, then transmitted and decoded during the reading of the video stream.

Compression of the Meshes

At the end of the preceding steps, each frame is associated with a mesh specific thereto within a stream 172 of volumetric video data comprising mesh data T and mesh data M, with a reference mesh associated with each key frame and information relating to the modifications of the reference mesh for each inter-frame in a given group of frames.

In a step 301 of testing, it is determined whether the incoming data are mesh data M or texture data T.

In a step 350, a conventional method of compression is applied to each mesh retrieved in the mesh data M, consisting in discretizing the coordinates of the points defining the mesh and the coordinates of the textures associated with a subset of values, for a reduction in the occupied memory.

In a test step 352, it is determined whether a given mesh is associated with a key frame or an inter-frame.

In a step 354, a compression method is applied to the information representative of the meshes of the key frames, comprising the sub-steps 354-1, 354-2 and 354-3, each adapted to a particular type of the data which, considered in their entirety, define the meshes of the key frames.

In step 354-1, the information representative of the triangles of the key frames is compressed by using an "Edgebreaker" algorithm, known for example from J. Rossignac, "Edgebreaker; Connectivity compression for triangle meshes", IEEE Transactions on Visualization and Computer Graphics, Vol. 5, No. 1, pp. 47-61.

In step 354-2, the information representative of the points, or vertices, of the key frames is compressed by applying a prediction algorithm according to known methods, as explained for example in the reference C. Touma and C. Gotsman, Triangle Mesh Compression, Proceedings Graphics Interface 98, pp. 26-34, 1998.

In step 354-3, the information representative of the texture coordinates of the triangles of the key frames is compressed by a linear selective prediction algorithm, as described for example by Isenburg, M, and Snoyeink, J. in "Compressing texture coordinates with selective linear predictions", Proceedings of Computer Graphics International 2003.

Said "linear selective prediction" algorithm encodes the texture coordinates per point (vertex) whereas they are ordinarily encoded per triangle, which reduces the number and allows better compression as well as optimization of the calculations during decoding.

In a step 356, a compression method is applied by means of differential coding to the information representative of the points, or vertices, of the inter-frames.

Within a group of frames, the triangles and the coordinates of textures of the inter-frames are the same as those of the corresponding key frame, the differences thereof are therefore zero within each group of frames, and said information does not require being re-encoded.

Only the information relating to the positions of the points, which may vary from one frame to another, will need to be encoded, and only the variations between frames shall be encoded, according to the principle of the differential coding.

The differential coding, also called delta or delta encoding, is a lossless data compression technique consisting in transforming data by the series of successive data differences; a particularly effective technique in the present case.

In a step 358, the information compressed during the steps 354-1 to 354-3 and 356 is again compressed, this time by means of an entropy calculation algorithm.

It is specifically favorable to perform an entropy calculation by arithmetic compression, such as FSE (Finite State Entropy), resulting in an excellent compression ratio for the type of data processed.

It should be noted that even if the steps 354-1 to 354-3, 356 and 358 are, taken individually, already known to a person skilled in the art, the combination thereof as described here is novel and results in superior results to the known combinations of conventional methods in the field of optics of obtaining a compressed video stream capable of being viewed on line.

Indeed, the video data relating to the meshes can, when compressed according to the application, easily be decoded in real time by conventional calculation systems.

During a step 360, the data streams resulting from steps 308, 310 and 358 are combined into a video file capable of being decoded in streaming mode for viewing via a computer network.

Decoding

Figure 6:
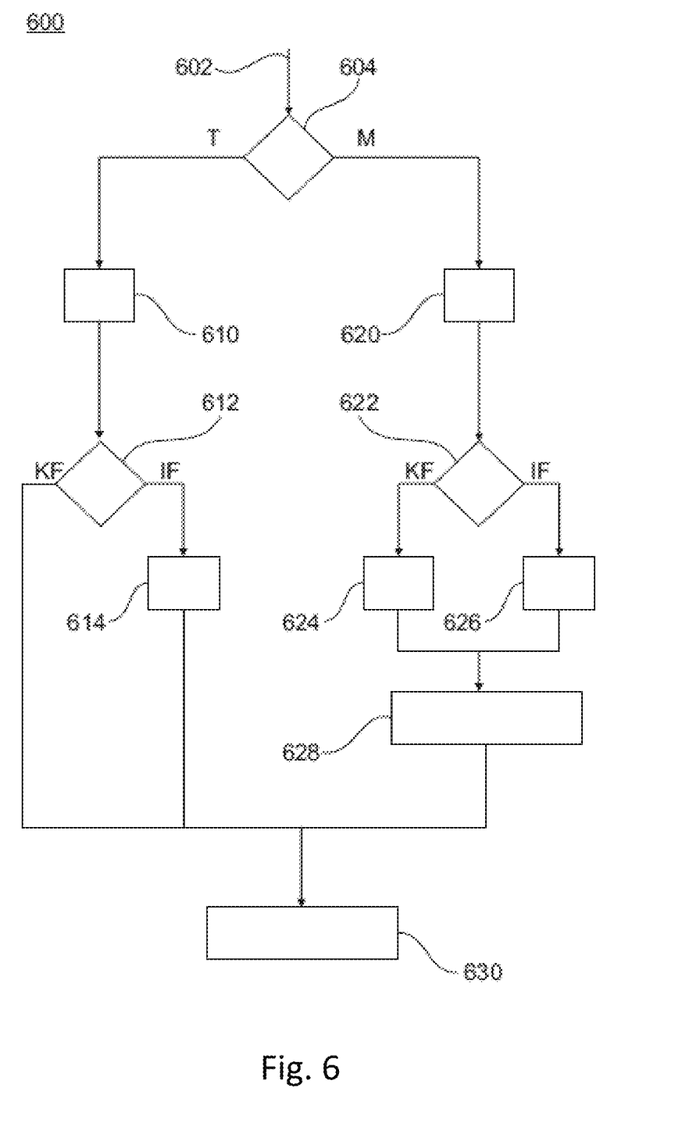
FIG. 6 is a diagram illustrating the decompression of a compressed volumetric video data stream according to the application.

During the streaming of a video stored in the form of the video file of step 360, the information representative of the frames is sent via a computer network and decoded sequentially, as they arrive at the computer system of the user in the form of a compressed data stream 602, according to the diagram of FIG. 6.

The data representative of each frame arrives sequentially according to the order of its respective frames in the video stream and is decoded in this order, the texture data T and the mesh data M being separated.

The frames comprise the key frames and the inter-frames identified respectively as KF and IF in the figure and represent the items of information to be decoded, M and T for the information representative of the meshes and of the textures, respectively.

During a test step 604, the data representative of the meshes and of the textures are identified respectively, subsequently to be decoded separately.

During a step 610, the data representative of the textures T are subjected to an entropy decoding.

During a test step 612, the decoded data of step 610 and corresponding respectively to the key frames KF and to the inter-frames IF are identified.

The data representative of the textures of the key frames KF do not require additional processing, since it is always in a compressed format, it is the block compression of step 302, it being possible to process the products thereof directly by the conventional graphics processing units.

However, during a step 614, the data representative of the textures of the inter-frames IF, which depend on the data of the other frames, are processed so as to take the data of the preceding frame again and to modify them by replacing those from the blocks for which a new block has been encoded following the step 310 by the corresponding new block.

This is a computational point of view of a trivial and very fast operation.

During a step 620, the data representative of the meshes M are first of all subjected to a decoding of the entropy encoding by FSE, which is carried out according to conventional algorithms for very rapid execution.

During a test step 622, the data corresponding respectively to the key frames KF and to the inter-frames IF are identified.

During a step 624, the data M representative of the meshes of the key frames KF obtained following the steps 354-1, 354-2 and 354-3 are decoded independently of the data of the other frames according to conventional methods, rapid with respect to the types of compression used (prediction or Edgebreaker) for said data.

During a step 626, the data representative of the meshes M of the inter-frames IF obtained following step 354, and which depend on the previously decoded data of the key frames KF, upon which they depend respectively, are decoded according to conventional, very rapid methods, since it is only a delta compression on the positions of the vertices.

During a step 628, the de-quantization of the mesh data from steps 624 and 626 is carried out according to conventional methods.

Finally, the data obtained following the operations 610, 614 and 628 are processed by a data processing unit and/or a graphics processing unit in a conventional manner in order to proceed with the display 630 of the video.

By virtue of the specific methods used for encoding the video data, the weight of the data as well as the decoding speed have been substantially improved, the decoding being able to be implemented by conventional computing units.

It goes without saying that the present invention is not limited to the embodiment disclosed above, and is capable of undergoing modifications without departing from the scope of the invention.

The invention claimed is:

1. A method for compressing a volumetric video stream of a three-dimensional action scene represented by a plurality of frames, the method being implemented by computer, and according to which a mesh and a texture for each frame of the scene are generated and groups of frames each comprising a key frame and inter-frames are defined, the meshes thereof being defined with respect to the mesh of the corresponding key frame, the method comprising a step of compressing information representative of the textures and wherein the texture compression step comprises, for each frame group, the steps of:

compressing the information representative of the textures of each of the frames of the group according to a block compression method producing an encoding of the texture by blocks of pixels of the same size, each encoded block being independent of the other blocks, the compression method therefore being capable of forming blocks directly usable by a conventional graphics processing unit according to standard algorithms such as DXT, ASTC or PVRTC, thus defining blocks of pixels directly usable by a conventional graphics processing unit, and comprising blocks associated with the key frame and blocks respectively associated with each of the inter-frames;

determining, from the blocks associated with the key frame and blocks associated with the inter-frames, on the one hand, first blocks capable of forming a composite texture of the key frame, and on the other hand second blocks capable of modifying, by means of iterative replacement of blocks, the composite texture of the key frame by copying these second blocks into the composite texture so as to form approximated textures of the inter-frames;

forming a composite texture of the key frame of the group of frames from first blocks associated with the key frame and first blocks associated with the inter-frames, and encoding said composite texture; and encoding the textures of the inter-frames based on the composite texture of the key frame and the second blocks.

2. The method according to claim 1, wherein the steps of encoding the composite textures of the key frames and the textures of the inter-frames comprise a compression by means of entropy coding.

3. The method according to claim 1, wherein the step of determining the first blocks and the second blocks comprises a step of evaluating quantized graphical differences on the basis of differences in luminance or chrominance of the blocks of a group of frames of a given position relative to one another, said step of evaluation being based on calculations such as calculations of PSNR between two considered blocks of the group of frames, each of the blocks belonging to a respective frame, and by repeating this calculation for each of the blocks of the group of frames vis-à-vis other blocks of the group of frames, resulting in numbers each representative of the graphical differences between the two blocks being considered.

4. The method according to claim 3, wherein, for each of the blocks of the group of frames, the graphical differences are evaluated vis-à-vis all of the other blocks of the group of frames.

5. The method according to claim 3, wherein the step of determining the first blocks and the second blocks further comprises steps of:

constructing a graph comprising interconnected nodes identified by $U_{p,q}$ according to $p^{th}$ rows and $q^{th}$ columns, each row being dedicated to evaluations of amplitude of the graphical differences quantized on the basis of differences in luminance or chrominance between blocks of a given position in the frames of the group of frames, therefore over time, each column being dedicated to a frame of the group of frames, the frames being classified in their order of appearance in the volumetric video stream, each node corresponding to the use of a block of the position of the considered block in the texture of the $p^{th}$ frame for encoding the texture of the $q^{th}$ frame, the quantized graphical differences being assigned to a cost of unit displacement along a line between two nodes, said displacement cost being representative of the quantized graphical differences between two blocks of a group of frames of a given position, and a calculation cost, which is defined by a user and determines a compression ratio of the method, being assigned to the displacements according to a column, and determining a lowest cost path in this graph, each path start in a column being associated with one of the first blocks and each displacement according to a column being associated with one of the second blocks, the lowest cost being equal to a sum of costs of displacements each between two nodes on a same row and costs of displacements each between two nodes on one and the same column, the path being constituted of the displacements each between two nodes on a same row and displacements each between two nodes on a same column.

6. The method according to claim 5, wherein the step of determining a path implements a Dijkstra algorithm.

7. The method according to claim 1, further comprising a step of compressing information representative of the meshes comprising the steps of:

compressing the information representative of the meshes by quantization;

compressing the information representative of the quantized meshes according to a compression method that comprises the steps of:

compressing the information representative of triangles of the mesh triangles of the key frames according to the Edgebreaker algorithm;

compressing information representative of points of the meshes of the key frames according to a prediction algorithm;

compressing information representative of texture coordinates of the key frames according to a linear selective prediction algorithm; and compressing information representative of points of the inter-frame meshes by differential encoding; and compressing, by means of an entropy calculation algorithm, the compressed information representative of said points of the meshes, of said triangles and of said texture coordinates of the key frames as well as the information representative of the points of the meshes of the inter-frames.

8. A data processing system comprising means for performing the steps of the method according to claim 1.

9. A computer program comprising instructions which, when the program is executed by a computer, lead the latter to implement the steps of the method according to claim 1.

10. A non-transitory computer-readable medium comprising instructions which, when executed by a computer, lead the latter to implement the steps of the method according to claim 1.

11. The method according to claim 2, wherein the step of determining the first blocks and the second blocks comprises a step of evaluating quantized graphical differences on the basis of differences in luminance or chrominance of the blocks of a group of frames of a given position relative to one another, said step of evaluation being based on calculations such as calculations of PSNR between two considered blocks of the group of frames, each of the blocks belonging to a respective frame, and by repeating this calculation for each of the blocks of the group of frames vis-à-vis other blocks of the group of frames, resulting in numbers each representative of the graphical differences between the two blocks being considered.

12. The method according to claim 11, wherein, for each of the blocks of the group of frames, the graphical differences are evaluated vis-à-vis all of the other blocks of the group of frames.

13. The method according to claim 4, wherein the step of determining the first blocks and the second blocks further comprises steps of:
    constructing a graph comprising interconnected nodes identified by $U_{p,q}$ according to $p^{th}$ rows and $q^{th}$ columns, each row being dedicated to evaluations of amplitude of the graphical differences quantized on the basis of differences in luminance or chrominance between blocks of a given position in the frames of the group of frames, therefore over time, each column being dedicated to a frame of the group of frames, the frames being classified in their order of appearance in the volumetric video stream, each node corresponding to the use of a block of the position of the considered block in the texture of the $p^{th}$ frame for encoding the texture of the $q^{th}$ frame, the quantized graphical differences being assigned to a cost of unit displacement along a line between two nodes, said displacement cost being representative of the quantized graphical differences between two blocks of a group of frames of a given position, and a calculation cost, which is defined by a user and determines a compression ratio of the method, being assigned to the displacements according to a column, and
    determining a lowest cost path in this graph, each path start in a column being associated with one of the first blocks and each displacement according to a column being associated with one of the second blocks, the lowest cost being equal to a sum of costs of displacements each between two nodes on a same row and costs of displacements each between two nodes on one and the same column, the path being constituted of the displacements each between two nodes on a same row and displacements each between two nodes on a same column.

14. The method according to claim 2, further comprising a step of compressing information representative of the meshes comprising the steps of:
    compressing the information representative of the meshes by quantization;
    compressing the information representative of the quantized meshes according to a compression method that comprises the steps of:
    compressing information representative of triangles of the mesh triangles of the key frames according to the Edgebreaker algorithm;
    compressing information representative of points of the meshes of the key frames according to a prediction algorithm;
    compressing information representative of texture coordinates of the key frames according to a linear selective prediction algorithm; and
    compressing information representative of points of the inter-frame meshes by differential encoding; and
    compressing, by means of an entropy calculation algorithm, the compressed information representative of said points of the meshes, of said triangles and of said texture coordinates of the key frames as well as the information representative of the points of the meshes of the inter-frames.

15. The method according to claim 5, further comprising a step of compressing information representative of the meshes comprising the steps of:
    compressing the information representative of the meshes by quantization;
    compressing the information representative of the quantized meshes according to a compression method that comprises the steps of:
    compressing information representative of triangles of the mesh triangles of the key frames according to the Edgebreaker algorithm;
    compressing information representative of points of the meshes of the key frames according to a prediction algorithm;
    compressing information representative of texture coordinates of the key frames according to a linear selective prediction algorithm; and
    compressing information representative of points of the inter-frame meshes by differential encoding; and
    compressing, by means of an entropy calculation algorithm, the compressed information representative of said points of the meshes, of said triangles and of said texture coordinates of the key frames as well as the information representative of the points of the meshes of the inter-frames.

* * * * *